(12) United States Patent
Sicola

(10) Patent No.: US 7,966,449 B2
(45) Date of Patent: *Jun. 21, 2011

(54) DISTRIBUTED STORAGE SYSTEM WITH GLOBAL REPLICATION

(75) Inventor: Stephen J. Sicola, Monument, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 419 days.

This patent is subject to a terminal disclaimer.

(21) Appl. No.: 12/167,152

(22) Filed: Jul. 2, 2008

(65) Prior Publication Data

US 2008/0281830 A1    Nov. 13, 2008

Related U.S. Application Data

(63) Continuation of application No. 11/479,432, filed on Jun. 30, 2006, now Pat. No. 7,644,228, which is a continuation-in-part of application No. 11/145,403, filed on Jun. 3, 2005.

(51) Int. Cl.
*G06F 12/00*    (2006.01)

(52) U.S. Cl. .. 711/112; 711/114; 711/162; 711/E12.076

(58) Field of Classification Search .................... None
See application file for complete search history.

(56) References Cited

U.S. PATENT DOCUMENTS

| | | | |
|---|---|---|---|
| 3,725,883 A | 4/1973 | Bennett et al. | |
| 4,454,566 A | 6/1984 | Coyne | |
| 4,754,397 A | 6/1988 | Varaiya et al. | |
| 4,903,170 A | 2/1990 | Finney et al. | |
| 5,124,886 A | 6/1992 | Golobay | |
| 5,247,427 A | 9/1993 | Driscoll et al. | |
| 5,325,270 A | 6/1994 | Wenger et al. | |
| 5,511,177 A | 4/1996 | Kagimasa et al. | |
| 5,517,373 A | 5/1996 | Hanson | |
| 5,604,662 A | 2/1997 | Anderson et al. | |
| 5,708,796 A | 1/1998 | Ozden et al. | |
| 5,729,763 A | 3/1998 | Leshem | |
| 5,752,257 A | 5/1998 | Ripoll et al. | |
| 5,822,184 A | 10/1998 | Rabinovitz | |
| 5,828,547 A | 10/1998 | Francovich et al. | |
| 5,889,650 A | 3/1999 | Bertilsson et al. | |
| 5,913,926 A | 6/1999 | Anderson et al. | |
| 5,974,490 A | 10/1999 | Fujimura et al. | |
| 6,076,142 A | 6/2000 | Corrington et al. | |
| 6,201,692 B1 | 3/2001 | Gamble et al. | |
| 6,230,217 B1 | 5/2001 | Tuccio et al. | |
| 6,243,790 B1 | 6/2001 | Yorimitsu | |
| 6,351,374 B1 | 2/2002 | Sherry | |
| 6,397,293 B2 | 5/2002 | Shrader et al. | |
| 6,442,022 B1 | 8/2002 | Paul | |
| 6,464,509 B1 | 10/2002 | Emberty et al. | |

(Continued)

FOREIGN PATENT DOCUMENTS

EP    1026688 A2    8/2000

(Continued)

*Primary Examiner* — Reginald G Bragdon
*Assistant Examiner* — Thanh D Vo
(74) *Attorney, Agent, or Firm* — McCarthy Law Group

(57) ABSTRACT

A data storage system apparatus and associated method with a virtualization engine connectable to a remote device over a network for passing access commands between the remote device and a storage space. A plurality of intelligent storage elements (ISEs) are configured for replicating data from a first ISE to a second ISE independently of access commands being simultaneously passed between the virtualization engine and the first ISE.

19 Claims, 10 Drawing Sheets

U.S. PATENT DOCUMENTS

| | | |
|---|---|---|
| 6,496,376 B1 | 12/2002 | Plunkett et al. |
| 6,574,687 B1 | 6/2003 | Teachout et al. |
| 6,606,690 B2 | 8/2003 | Padovano |
| 6,618,246 B2 | 9/2003 | Sullivan et al. |
| 6,629,262 B1 | 9/2003 | Inagaki et al. |
| 6,651,138 B2 | 11/2003 | Lai et al. |
| 6,683,793 B1 | 1/2004 | Campbell et al. |
| 6,708,265 B1 | 3/2004 | Black |
| 6,748,502 B2 | 6/2004 | Watanabe et al. |
| 6,816,917 B2 | 11/2004 | Dicorpo et al. |
| 6,820,146 B2 | 11/2004 | Cox |
| 6,820,171 B1 | 11/2004 | Weber et al. |
| 6,845,403 B2 | 1/2005 | Chadalapaka |
| 6,959,373 B2 | 10/2005 | Testardi |
| 6,970,973 B2 | 11/2005 | Katsuragi et al. |
| 6,977,927 B1 | 12/2005 | Bates et al. |
| 6,986,015 B2 | 1/2006 | Testardi |
| 2002/0103923 A1 | 8/2002 | Cherian et al. |
| 2002/0131257 A1 | 9/2002 | Agard |
| 2002/0144044 A1 | 10/2002 | Moon et al. |
| 2003/0041201 A1 | 2/2003 | Rauscher |
| 2003/0070043 A1 | 4/2003 | Merkey |
| 2003/0081378 A1 | 5/2003 | Debbins et al. |
| 2004/0057203 A1 | 3/2004 | Rabinovitz |
| 2005/0033878 A1 | 2/2005 | Pangal et al. |
| 2005/0071599 A1 | 3/2005 | Modha et al. |
| 2005/0240649 A1 | 10/2005 | Elkington et al. |

FOREIGN PATENT DOCUMENTS

| | | |
|---|---|---|
| WO | 9745784 A2 | 12/1997 |
| WO | 9960832 A1 | 11/1999 |

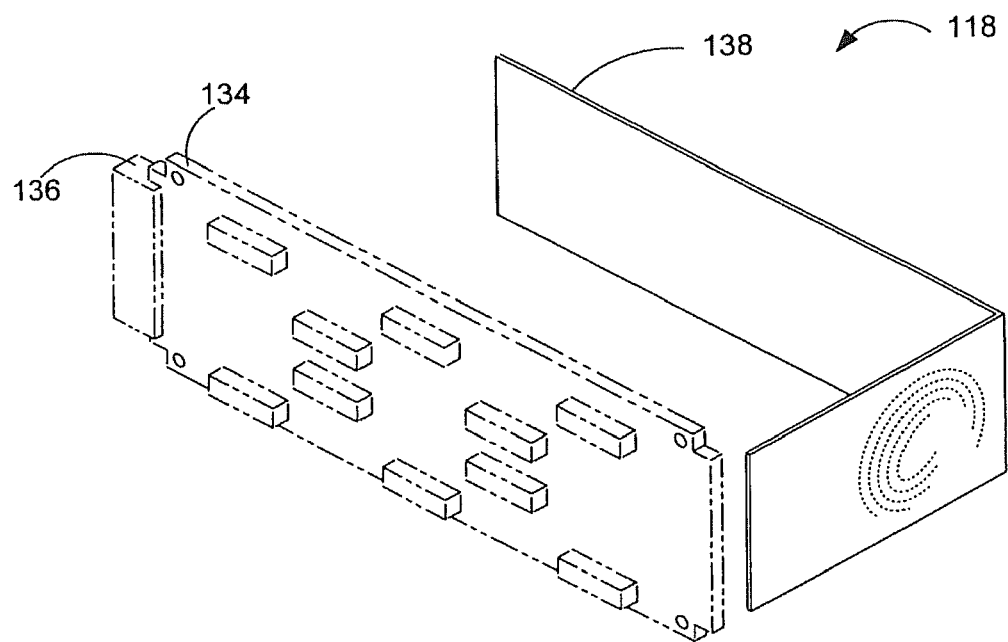
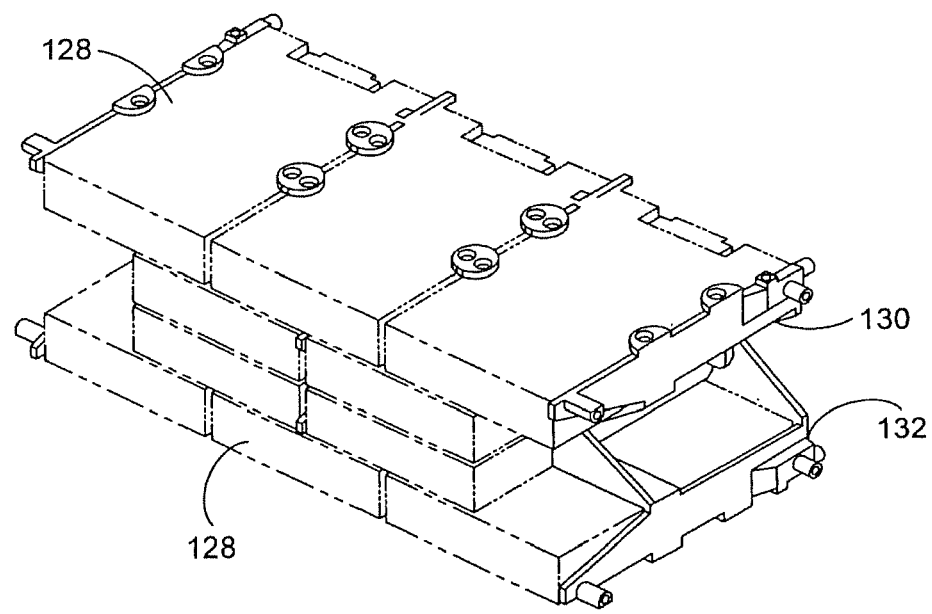
FIG. 4

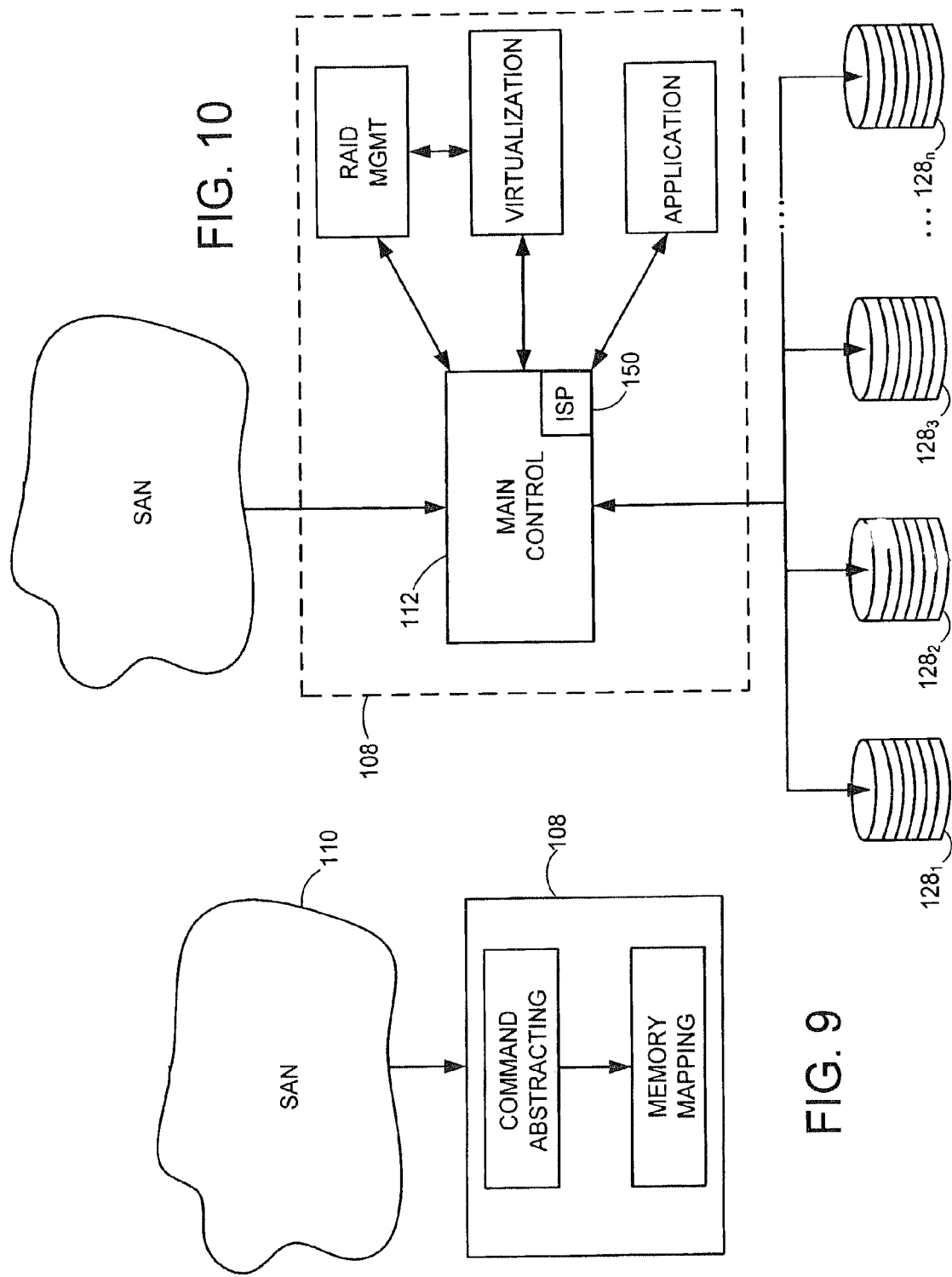

DISTRIBUTED STORAGE SYSTEM WITH GLOBAL REPLICATION

RELATED APPLICATIONS

This application is a continuation of U.S. application Ser. No. 11/479,432 filed Jun. 30, 2006, now U.S. Pat. No. 7,644, 228, which is a continuation-in-part of U.S. application Ser. No. 11/145,403 filed Jun. 3, 2005 and assigned to the assignee of this application.

FIELD OF THE INVENTION

The claimed invention relates generally to the field of distributed data storage systems and more particularly, but not by way of limitation, to an apparatus and method for global replication of read-only data in a distributed storage system.

BACKGROUND

Computer networking began proliferating when the data transfer rates of industry standard architectures could not keep pace with the data access rate of the 80386 processor made by Intel Corporation. Local area networks (LANs) evolved to storage area networks (SANs) by consolidating the data storage capacity in the network. Users have realized significant benefits by the consolidation of equipment and the associated data handled by the equipment in SANs, such as the capability of handling an order of magnitude more storage than would otherwise be possible with direct attached storage, and doing so at manageable costs.

More recently the movement has been toward a network-centric approach to controlling the data storage subsystems. That is, in the same way that the storage was consolidated, so too are the systems that control the functionality of the storage being offloaded from the servers and into the network itself. Host-based software, for example, can delegate maintenance and management tasks to intelligent switches or to a specialized network storage services platform. Appliance-based solutions eliminate the need for the software running in the hosts, and operate within computers placed as a node in the enterprise. In any event, the intelligent network solutions can centralize such things as storage allocation routines, backup routines, and fault tolerance schemes independently of the hosts.

While moving the intelligence from the hosts to the network resolves some problems such as these, it does not resolve the inherent difficulties associated with the general lack of flexibility in altering the presentation of virtual storage to the hosts. For example, data stored under the auspices of one controller might be more efficiently accessed in the storage space of a different controller. In this event either the host or the network must first copy the data in order to make it available to the other controller. What is needed is an intelligent data storage subsystem that self-deterministically allocates, manages, and protects its respective data storage capacity and presents that capacity as a virtual storage space to the network to optimize I/O performance system wide. This virtual storage space is able to be provisioned into multiple storage volumes. A distributed computing environment uses these intelligent storage elements to share the load of processing I/O commands as evenly as possible throughout the storage array. It is to this solution that embodiments of the present invention are directed.

SUMMARY OF THE INVENTION

Embodiments of the present invention are generally directed to a distributed storage system with global replication capability.

In some embodiments a data storage system is provided with a virtualization engine connectable to a remote device over a network for passing access commands between the remote device and a storage space. A plurality of intelligent storage elements (ISEs) are configured for replicating data from a first ISE to a second ISE independently of access commands being simultaneously passed between the virtualization engine and the first ISE.

In some embodiments a method is provided for processing access commands between a virtualization engine and an ISE while simultaneously replicating data from the ISE to another storage space.

In some embodiments a data storage system is provided with a plurality of ISEs individually addressable by a virtualization engine and means for replicating data between the intelligent storage elements.

These and various other features and advantages which characterize the claimed invention will become apparent upon reading the following detailed description and upon reviewing the associated drawings.

BRIEF DESCRIPTION OF THE DRAWINGS

FIG. 4 is a partially exploded isometric view of a multiple disc array of the intelligent storage element of FIG. 3.

FIG. 9 is a functional block diagram representation of the command abstracting and associated memory mapping services performed by the intelligent storage element of FIG. 3.

FIG. 10 is a functional block diagram of other exemplary data services performed by the intelligent storage element of FIG. 3.

DETAILED DESCRIPTION

Figures 1, 2:
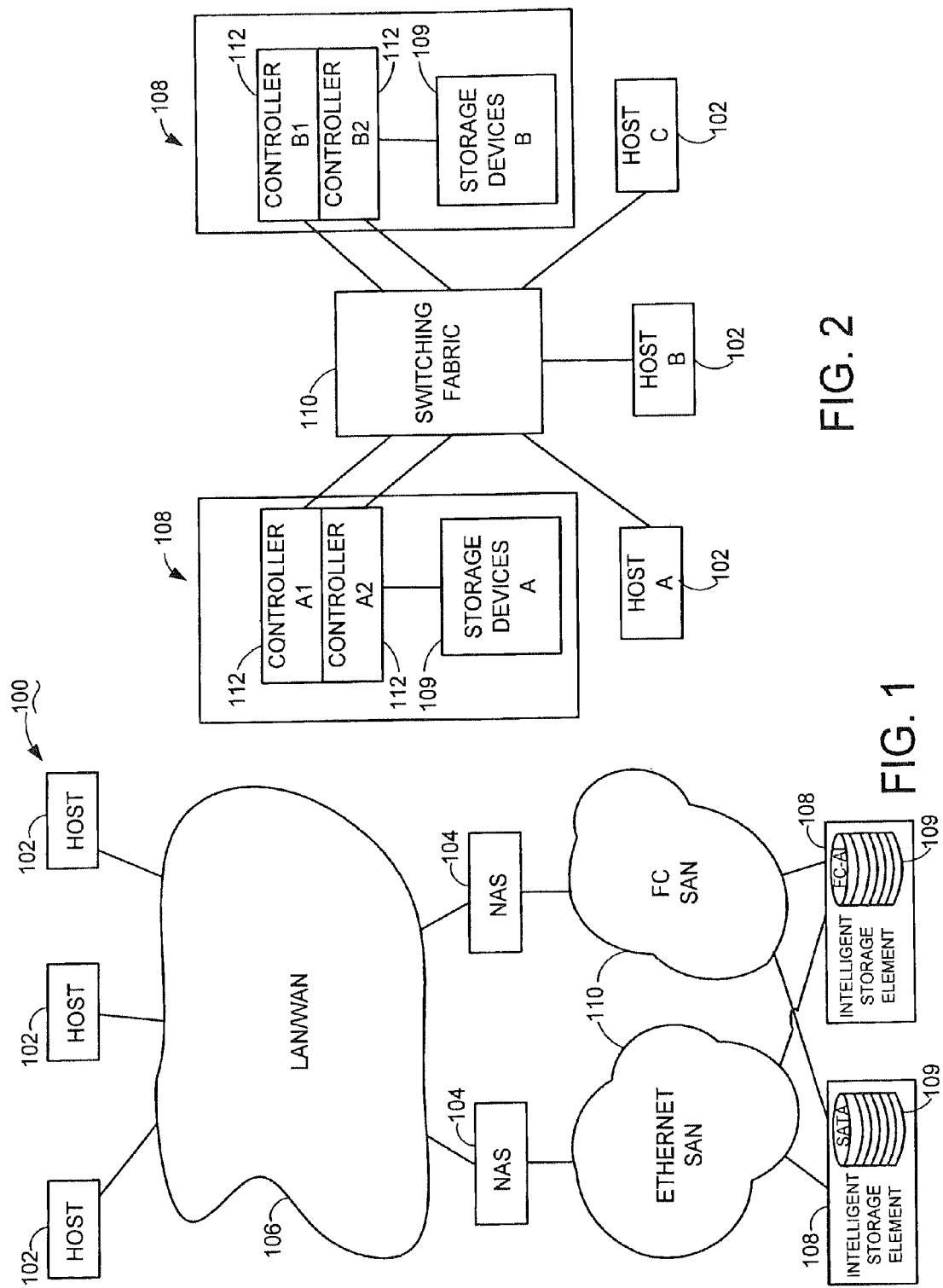
FIG. 1 is a diagrammatic representation of a computer system in which embodiments of the present invention are useful.
FIG. 2 is a simplified diagrammatic representation of the computer system of FIG. 1.

FIG. 1 is an illustrative computer system 100 in which embodiments of the present invention are useful. One or more hosts 102 are networked to one or more network-attached servers 104 via a local area network (LAN) and/or wide area network (WAN) 106. Preferably, the LAN/WAN 106 uses Internet protocol (IP) networking infrastructure for communicating over the World Wide Web. The hosts 102 access applications resident in the servers 104 that routinely need data stored on one or more of a number of intelligent storage elements ("ISEs") 108. Accordingly, SANs 110 connect the servers 104 to the ISEs 108 for access to the stored data. The ISEs 108 provide blocks of data storage capacity 109 for storing the data over various selected communication protocols such as serial ATA and fibre-channel, with enterprise or desktop class storage medium within it.

FIG. 2 is a simplified diagrammatic view of the computer system 100 of FIG. 1. The hosts 102 interact with each other as well as with a pair of the ISEs 108 (denoted A and B, respectively) via the network or fabric 110. Each ISE 108 includes dual redundant controllers 112 (denoted A1, A2 and B1, B2) preferably operating on the data storage capacity 109 as a set of data storage devices characterized as a redundant array of independent drives (RAID). The controllers 112 and data storage capacity 109 preferably utilize a fault tolerant arrangement so that the various controllers 112 utilize parallel, redundant links and at least some of the user data stored by the system 100 is stored in redundant format within at least one set of the data storage capacities 109.

It is further contemplated that the A host computer 102 and the A ISE 108 can be physically located at a first site, the B host computer 102 and B ISE 108 can be physically located at a second site, and the C host computer 102 can be yet at a third site, although such is merely illustrative and not limiting. All entities on the distributed computer system are connected over some type of computer network.

Figure 3:
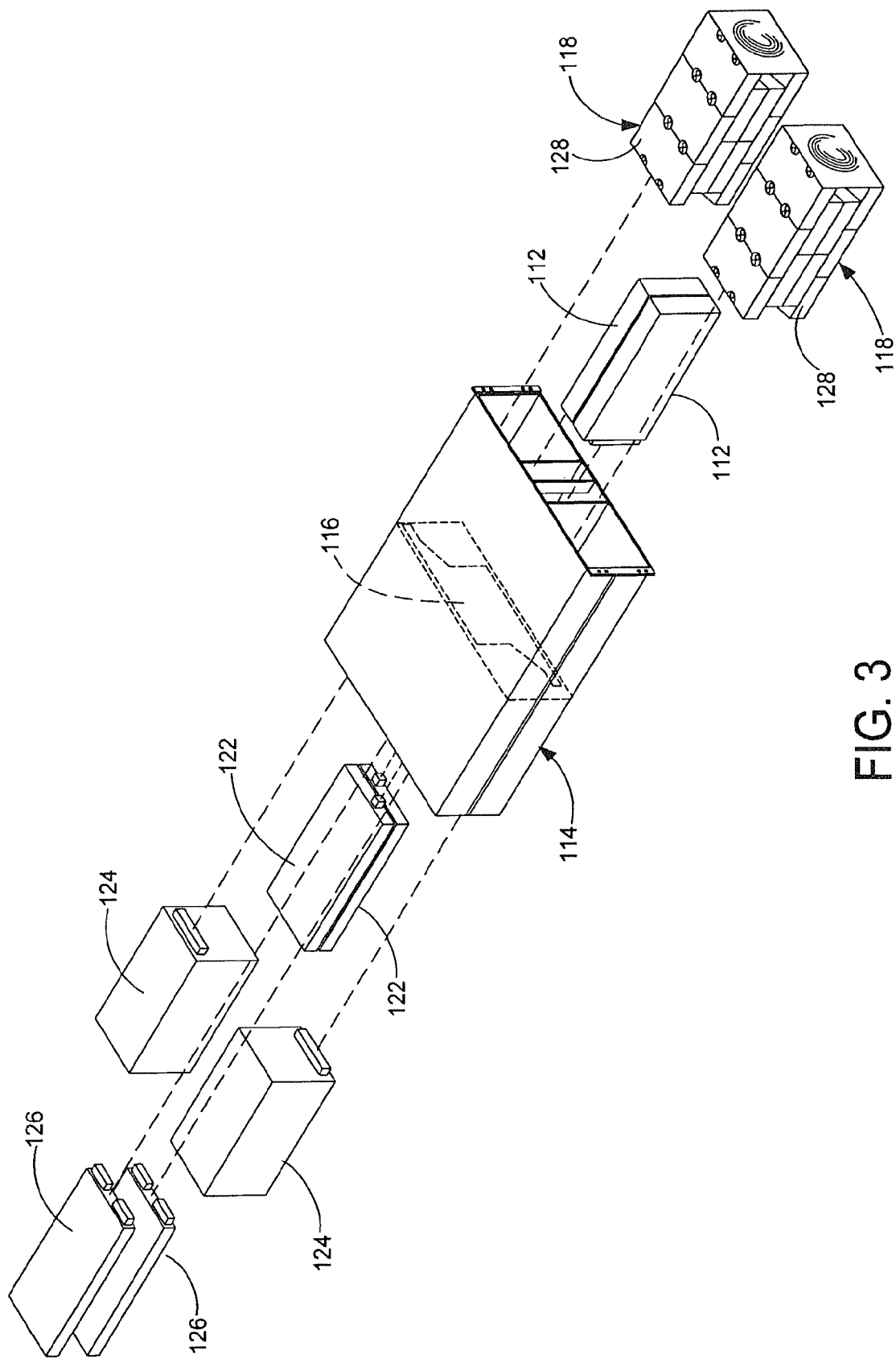
FIG. 3 is an exploded isometric view of an intelligent storage element constructed in accordance with embodiments of the present invention.

FIG. 3 illustrates an ISE 108 constructed in accordance with embodiments of the present invention. A shelf 114 defines cavities for receivingly engaging the controllers 112 in electrical connection with a midplane 116. The shelf 114 is supported, in turn, within a cabinet (not shown). A pair of multiple disc assemblies (MDAs) 118 are receivingly engageable with the shelf 114 on the same side of the midplane 116. Connected to the opposing side of the midplane 116 are dual batteries 122 providing an emergency power supply, dual alternating current power supplies 124, and dual interface modules 126. Preferably, the dual components are configured for operating either of the MDAs 118 or both simultaneously, thereby providing backup protection in the event of a component failure.

FIG. 4 is an enlarged partially exploded isometric view of an MDA 118 constructed in accordance with some embodiments of the present invention. The MDA 118 has an upper partition 130 and a lower partition 132, each supporting five data storage devices 128. The partitions 130, 132 align the data storage devices 128 for connection with a common circuit board 134 having a connector 136 that operably engages the midplane 116 (FIG. 3). A wrapper 138 provides electromagnetic interference shielding. This illustrative embodiment of the MDA 118 is the subject matter of patent application Ser. No. 10/884,605 entitled Carrier Device and Method for a Multiple Disc Array which is assigned to the assignee of the present invention and incorporated herein by reference. Another illustrative embodiment of the MDA is the subject matter of patent application Ser. No. 10/817,378 of the same title which is also assigned to the assignee of the present invention and incorporated herein by reference. In alternative equivalent embodiments the MDA 118 can be provided within a sealed enclosure, as discussed below.

Figure 5:
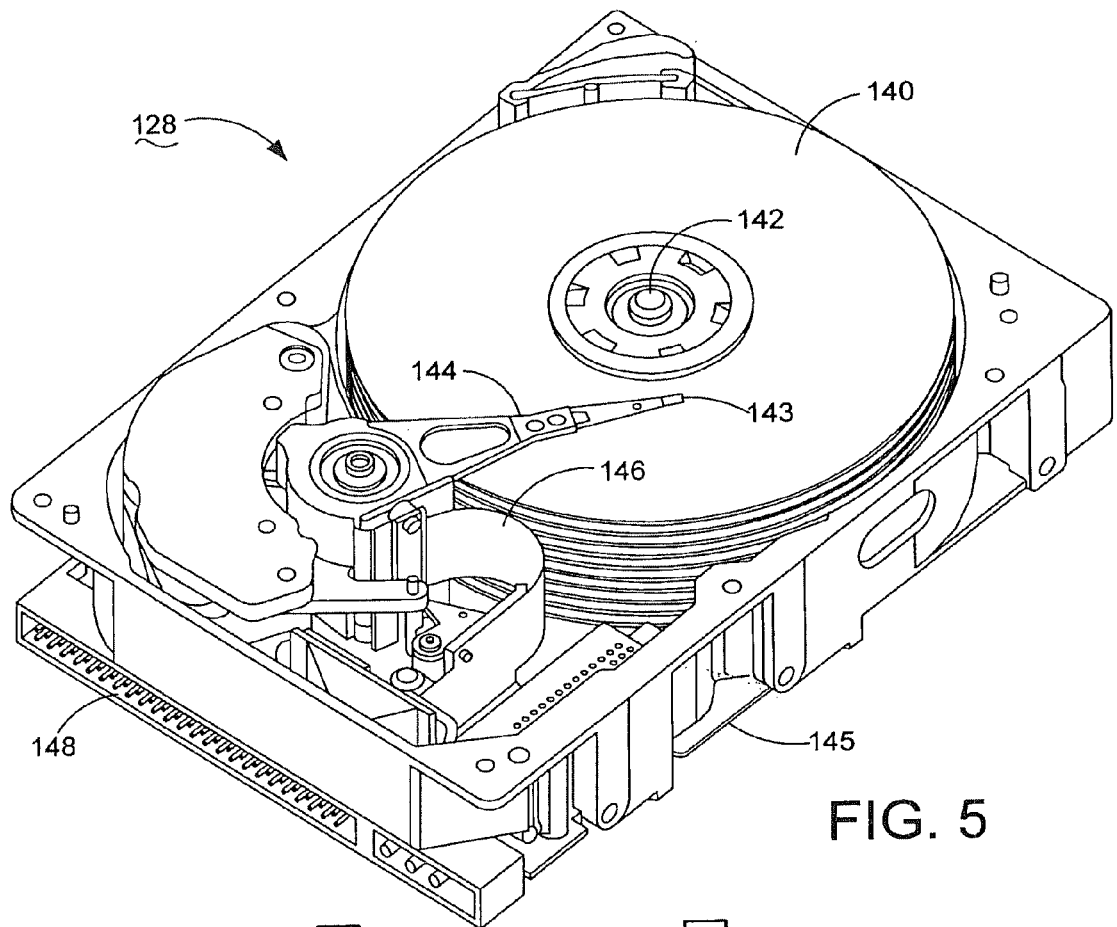
FIG. 5 is an exemplary data storage device used in the multiple disc array of FIG. 4.

FIG. 5 is an isometric view of an illustrative data storage device 128 suited for use with embodiments of the present invention and in the form of a rotating media disc drive. Although a rotating spindle with moving data storage medium is used for discussion purposes below, in alternative equivalent embodiment a non-rotating medium device, such as a solid state memory device is used. A data storage disc 140 is rotated by a motor 142 to present data storage locations of the disc 140 to a read/write head ("head") 143. The head 143 is supported at the distal end of a rotary actuator 144 that is capable of moving the head 143 radially between inner and outer tracks of the disc 140. The head 143 is electrically connected to a circuit board 145 by way of a flex circuit 146. The circuit board 145 is adapted to receive and send control signals controlling the functions of the data storage device 128. A connector 148 is electrically connected to the circuit board 145, and is adapted for connecting the data storage device 128 with the circuit board 134 (FIG. 4) of the MDA 118.

Figure 6:
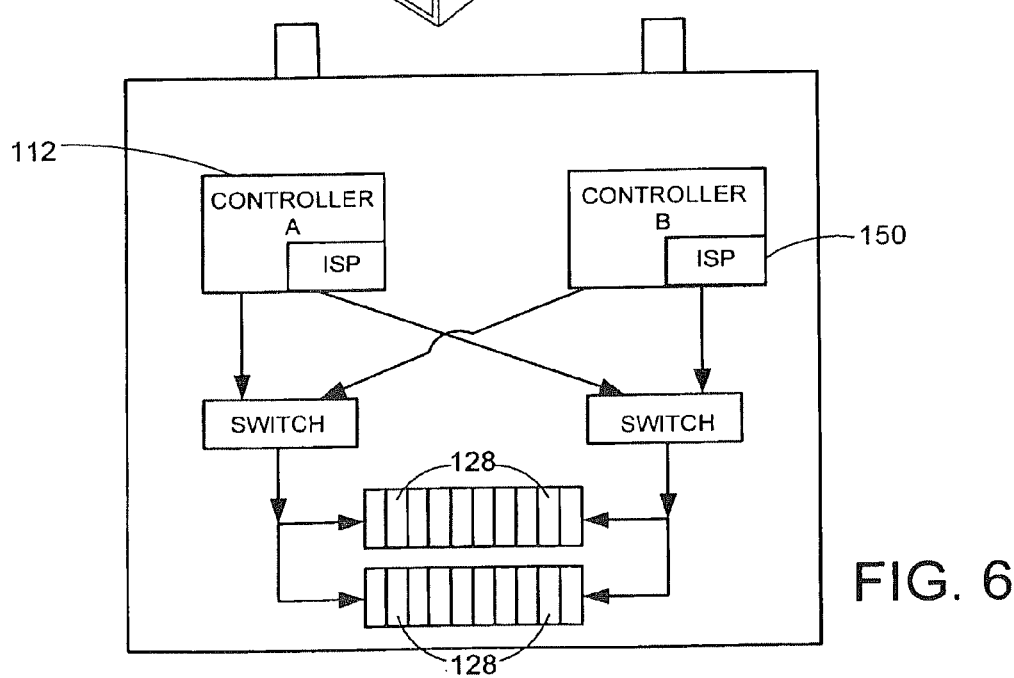
FIG. 6 is a functional block diagram of the intelligent storage element of FIG. 3.

FIG. 6 is a diagrammatic view of an ISE 108 constructed in accordance with embodiments of the present invention. The controllers 112 operate in conjunction with intelligent storage processors (ISPs) 150 to provide managed reliability of the data integrity. The ISPs 150 can be resident in the controller 112, in the MDA 118, or elsewhere within the ISE 108.

Aspects of the managed reliability include invoking reliable data storage formats such as RAID strategies. For example, by providing a system for selectively employing a selected one of a plurality of different RAID formats creates a relatively more robust system for storing data, and permits optimization of firmware algorithms that reduce the complexity of software used to manage the MDA 118, as well as resulting in relatively quicker recovery from storage fault conditions. These and other aspects of this multiple RAID format system is described in patent application Ser. No. 10/817,264 entitled Storage Media Data Structure and Method which is assigned to the present assignee and incorporated herein by reference.

Managed reliability can also include scheduling of diagnostic and correction routines based on a monitored usage of the system. Data recovery operations are executed for copying and reconstructing data. The ISP 150 is integrated with the MDAs 118 in such as way to facilitate "self-healing" of the overall data storage capacity without data loss. These and other aspects of the managed reliability aspects contemplated herein are disclosed in patent application Ser. No. 10/817,617 entitled Managed Reliability Storage System and Method which is assigned to the present assignee and incorporated herein by reference. Other aspects of the managed reliability include responsiveness to predictive failure indications in relation to predetermined rules, as disclosed for example in patent application Ser. No. 11/040,410 entitled Deterministic Preventive Recovery From a Predicted Failure in a Distributed Storage System which is assigned to the present assignee and incorporated herein by reference.

Figure 7:
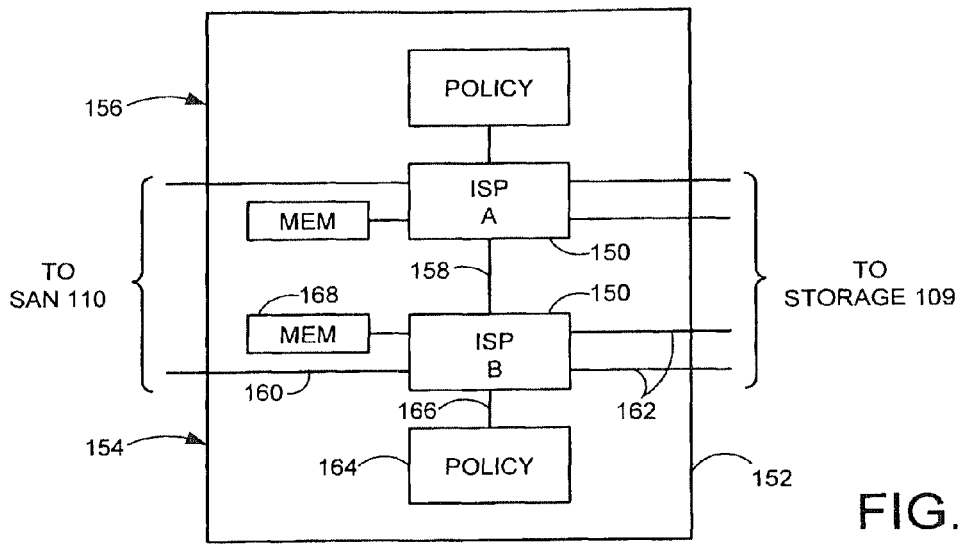
FIG. 7 is a functional block diagram of the intelligent storage processor circuit board of the intelligent storage element of FIG. 3.

FIG. 7 is a diagrammatic illustration of an ISP circuit board 152 in which resides a pair of redundant ISPs 150. The ISP 150 interfaces the data storage capacity 109 to the SAN fabric 110. Each ISP 150 can manage assorted storage services such as routing, volume management, and data migration and replication. The ISPs 150 divide the board 152 into two ISP subsystems 154, 156 coupled by a bus 158. The ISP subsystem 154 includes the ISP 150 denoted "B" which is connected to the fabric 110 and the storage capacity 109 by links 160, 162, respectively. The ISP subsystem 154 also includes a policy processor 164 executing a real-time operating system. The ISP 150 and policy processor 164 communicate over bus 166, and both communicate with memory 168.

Figure 8:
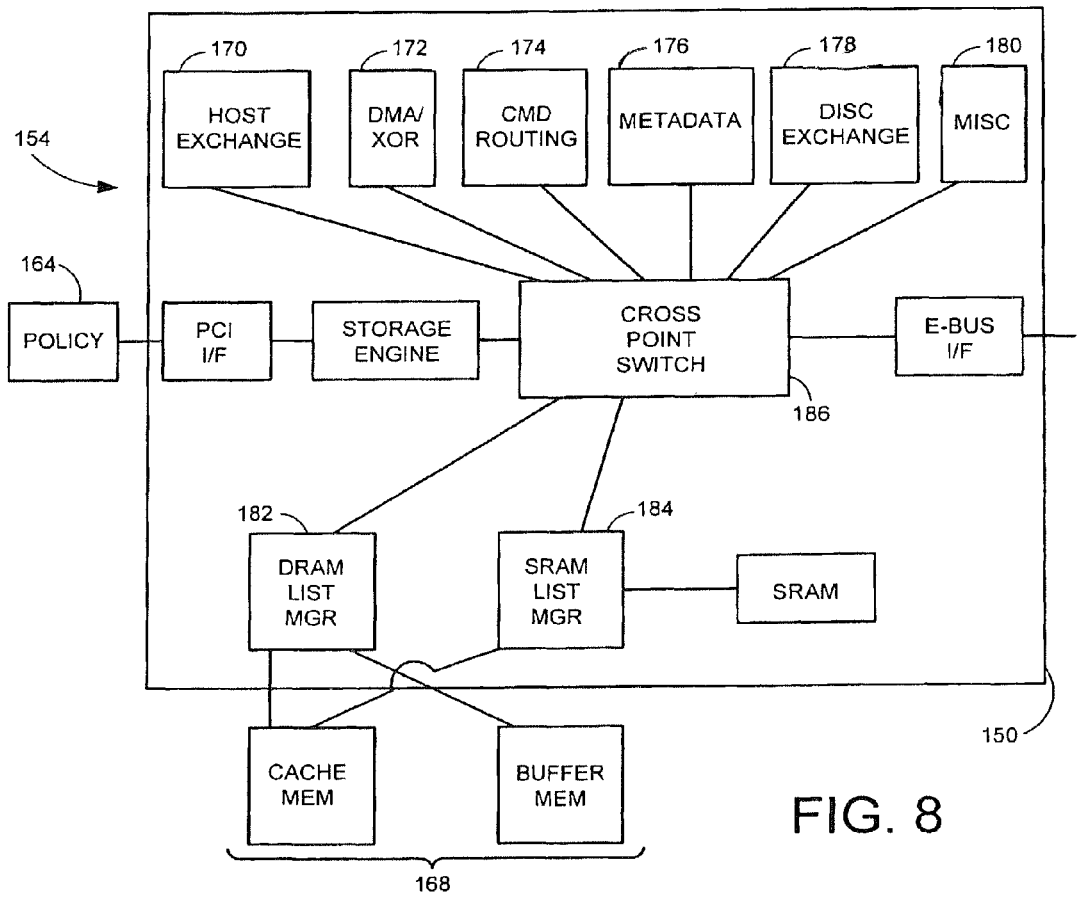
FIG. 8 is a functional block diagram of the intelligent storage processor of the intelligent storage element of FIG. 3.

FIG. 8 is a diagrammatic view of an illustrative ISP subsystem 154 constructed in accordance with embodiments of the present invention. The ISP 150 includes a number of functional controllers (170-180) in communication with list managers 182, 184 via a cross point switch (CPS) 186 message crossbar. Accordingly, the controllers (170-180) can each generate CPS messages in response to a given condition and send the messages through the CPS 186 to a list manager 182, 184 in order to access a memory module and/or invoke an ISP 150 action. Likewise, responses from a list manager 182, 184 can be communicated to any of the controllers (170-180) via the CPS 186. The arrangement of FIG. 8 and associated discussion are illustrative and not limiting of the contemplated embodiments of the present invention.

The policy processor 164 can be programmed to execute desired operations via the ISP 150. For example, the policy processor 164 can communicate with the list managers 182, 184, that is send and receive messages, via the CPS 186. Responses to the policy processor 164 can serve as interrupts signaling the reading of memory 168 registers.

FIG. 9 is a diagrammatic illustration of the flexibility advantages of the ISE 108, by way of the intelligent controllers 112, to communicate with a host 102 in any of a preselected plurality of communication protocols, such as FC, iSCSI, or SAS. The ISE 108 can be programmed to ascertain the abstraction level of a host command, and to map a virtual storage volume to the physical storage 109 associated with the command accordingly.

For present purposes, the term "virtual storage volume" means a logical entity that generally corresponds to a logical abstraction of physical storage. "Virtual storage volume" can include, for example, an entity that is treated (logically) as though it was consecutively addressed blocks in a fixed block architecture or records in a count-key-data architecture. A virtual storage volume can be physically located on more than one storage element.

FIG. 10 is a diagrammatic illustration of types of data management services that can be conducted by the ISE 108 independently of any host 102. For example, RAID management can be locally controlled for fault tolerant data integrity sake, with striping of data performed within a desired number of the data storage devices $128_1, 128_2, 128_3 \ldots 128_n$. Virtualization services can be locally controlled to allocate and/or deallocate memory capacity to logical entities. Application routines, such as the managed reliability schemes discussed above and data replication between logical volumes within the same ISE 108, can likewise be controlled locally. For purposes of this description and the appended claims, the term "migrating" or "migration" refers to moving data from a source to a destination, thereby eliminating the data at the source as part of a successful migration. This is opposed to "replicating" or "replication" which duplicates the data from a source to a destination, but with a different name at the destination. Replication is done in accordance with the present embodiments in order to efficiently provide a read-only copy of the data at a place other than where the data integrity is maintained.

Figure 11:
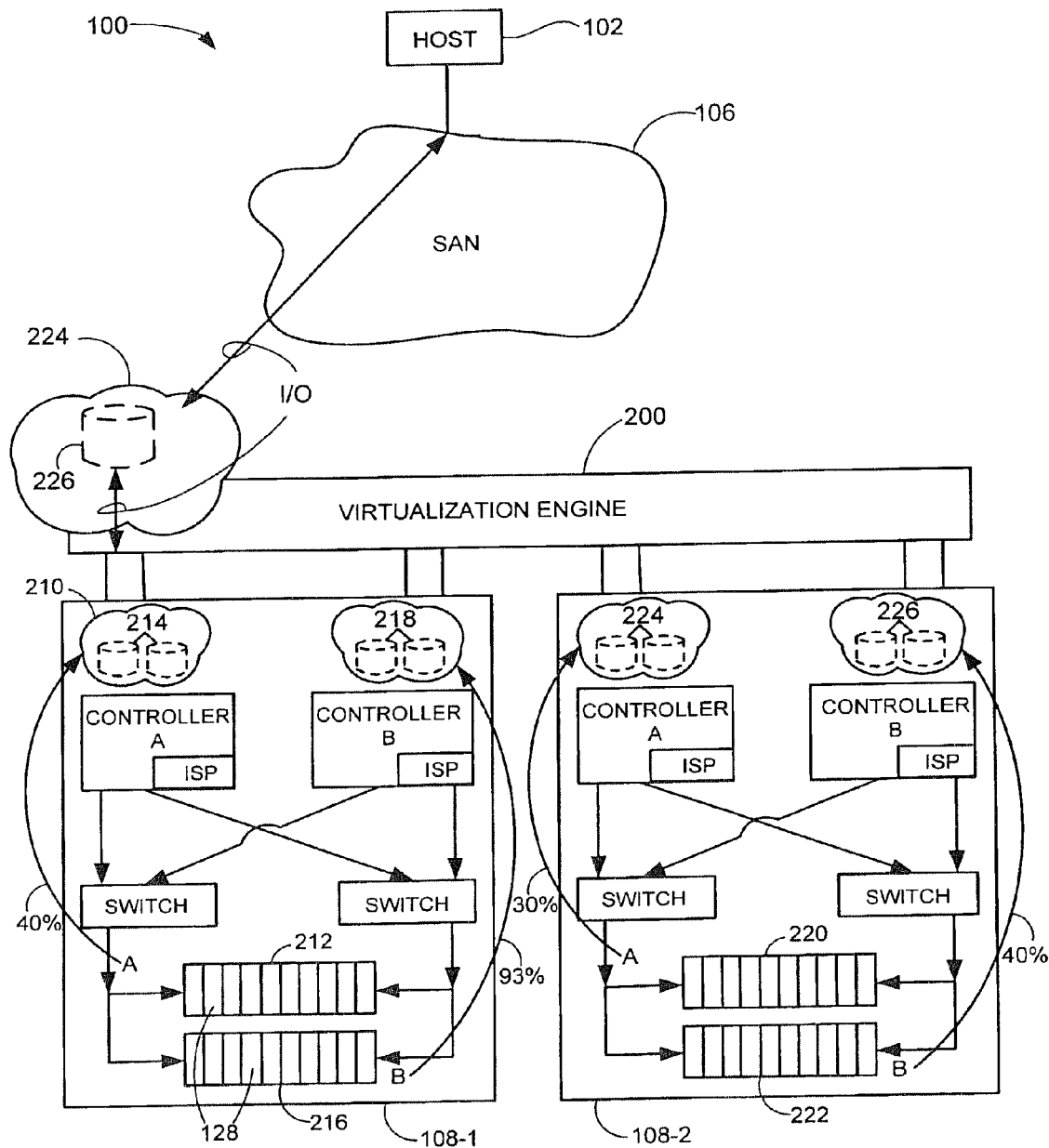
FIGS. 11-12 are diagrammatic views illustrating a manner of global replication in accordance with embodiments of the present invention.

FIG. 11 shows embodiments of the data storage system 100 wherein a virtualization engine 200 communicates with a remote host device 102 over the SAN 106 for passing access commands (I/O commands) between the host 102 and a selected one of a plurality of ISEs 108. Each of the ISEs 108 has two ports 202, 204 and 206, 208 that are uniquely addressable by the virtualization engine 200 for passing the access commands. In order to accelerate data replication, without creating data transfer bottlenecks, the following describes how the present embodiments contemplate replicating data between the ISEs 108 independently of and simultaneously to processing of the host access commands. Also, by varying the data transfer rates at which the data is replicated, the affects on system 100 application performance can be optimized.

In ISE 108-1 the ISP 150 creates a logical volume 210 related to the physical data pack 212 of data storage devices 128. It will be noted that for discussion sake it is assumed that 40% of the storage capacity of data pack 212 has been allocated to logical discs 214 in the logical volume 210. Again for sake of discussion, the data pack 212 and all other data packs below will be assumed to contain eight data storage devices 128 for data storage and two spare data storage devices 128. It will be noted further from FIG. 11 that in ISE 108-1 the other data pack 216 is assumed to have been 93% allocated to logical discs 218, and in ISE 108-2 the data packs 220, 222 are assumed to have been 30% and 40% allocated, respectively, to logical discs 224, 226.

The virtualization engine 200 has created a logical volume 224 from the logical discs 214 and, in response to a host request for storage space, created logical disc 226 and mapped it to the host 102.

Under certain predefined conditions it can be advantageous to process an access command by a controller other than the unit master controller for a particular LUN. As distinguished from mirroring, which copies all the data in a predetermined array for redundancy sake, the present embodiments directs a narrow read-only copy of data to a target storage space under conditions making it more likely the access command will be satisfied with a relatively higher performance.

For example, assume for the sake of discussion that an access command is received for data in LUN 214, but controller A in ISE 108-1 is presently involved in streaming sequential data access commands. Rather than interrupt the streaming commands to satisfy this parallel command, or waiting until the streaming is completed, controller A can direct a read-only copy of all or a portion of LUN 214 to a different storage space, such as to ISE 108-2 as shown in FIG. 12.

Generally, the unit master controller can look out over the system and identify another storage space that has a comparatively higher processing capability for satisfying a pending access command. The other storage space might be internal to the unit master controller, or external to the other controller within the same ISE 108, or might be globally located in another ISE 108. In any event, the comparative processing capabilities can be determined in relation to any of a number of desired parameters. For example, a comparison of resource availability for processing the access command is valuable. In other instances a comparison of the quality or quantity of I/O command queue depth might be used, or a comparison of managed reliability factors.

It will be noted that the present embodiments contemplate that only a snapshot copy of the data is replicated to the other storage space in order to satisfy a particular access command. The integrity of the data is maintained in the source LUN.

Figure 12:
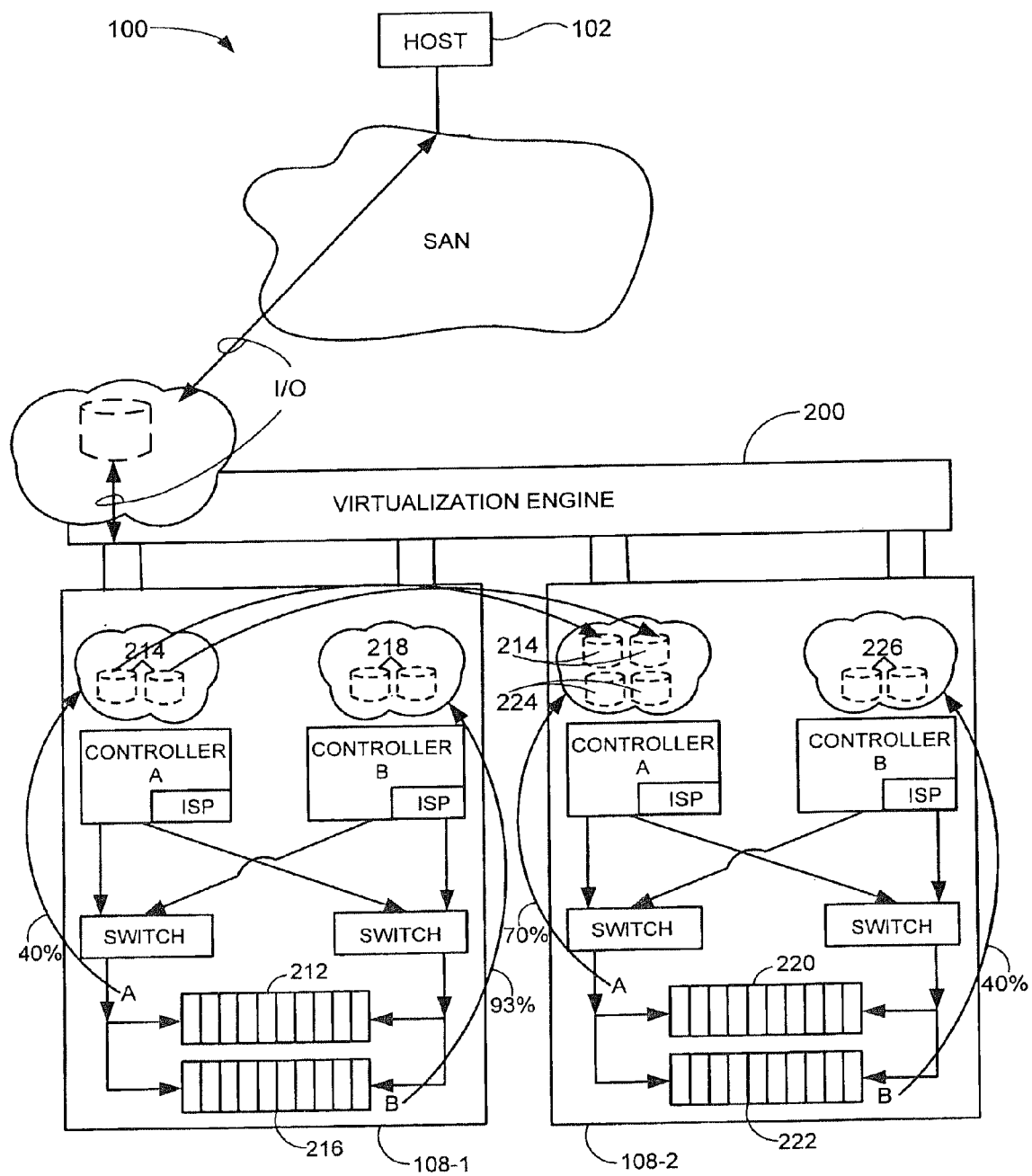

It will also be noted that the illustrative embodiments of FIG. 12 show an entire LUN being replicated in the other storage space. Alternatively, only a portion of a LUN can be replicated if that's all that is necessary to satisfy the pending access command. In the same vein, all or only a portion of a LUN along with its respectively allocated sub-LUN, or all or only a portion of only a sub-LUN can be copied as well. Generally, the replicated data should be no more than what is necessary to satisfy the pending access command.

Figure 13:
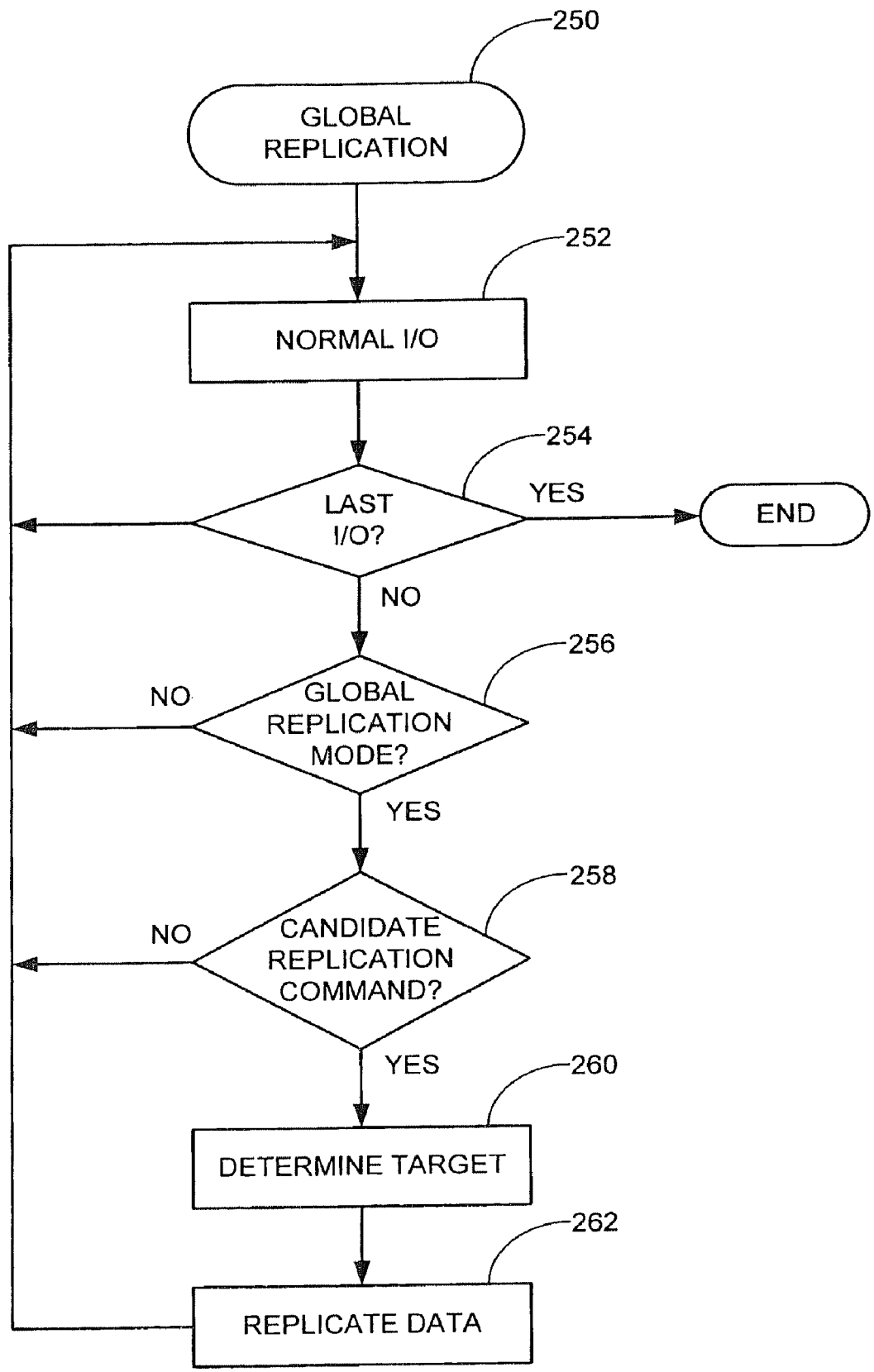
FIG. 13 is a flowchart of steps for practicing a method of GLOBAL REPLICATION in accordance with embodiments of the present invention.

FIG. 13 is a flowchart of illustrative steps for practicing a method 250 of GLOBAL REPLICATION in accordance with embodiments of the present invention. The method executes within a system mode of normal I/O processing represented by block 252. In block 254 it is determined whether the last I/O command has been processed; if yes, then the method ends.

In block 256 it is determined whether conditions exist that are favorable for considering global replication. For example, if the existing load shares are relatively even among a plurality of ISEs, valuable resources might be preserved by not constantly seeking for the optimal storage space to direct an access command if the conclusion is likely to be the unit master controller's own storage space. However, the skilled artisan recognizes that other conditions can exist that would advantageously trigger a global replication mode, such as but not limited to managed reliability concerns with a particular ISE 108, or a controller encumbered with streaming sequential data, or a particular ISE 108 that is currently idle and therefore having a relatively greater resource base available to it.

If the determination of block 256 is yes, then in block 258 it is determined whether a candidate access command exists for global replication. Again, a threshold determination can be advantageous so as to not scrutinize each access command, but those that are likely to drag down system performance. For example, as discussed above a scenario whereby the unit master controller is committed to streaming sequential data would be a likely candidate to satisfy a pending parallel access command. Another example would be where the unit master controller is committed to a short-stroking routine and a pending access command would require a deviation from the routine.

If the determination of block 258 is yes, then in block 260 the optimal storage space for satisfying the pending access command is determined. As discussed above, the determination is generally made in relation to which storage space affords a comparatively high processing capability for satisfying the pending access command. The "comparatively high processing capability" can be determined in relation to, but without limitation to, resource availability, pending I/O command queue depth, or managed reliability. The target storage space might be internally, externally, or globally located in relation to the unit master controller.

Finally, in block 262 the unit master controller replicates a read-only copy to the storage space determined in block 260. As discussed above, the size of the replicated data block is preferably no more than what is necessary to satisfy the pending access command. For example, the replicated data can involve all or only a portion of a LUN, or all or only a portion of a LUN and its respective sub-LUN, or all or only a portion of a sub-LUN.

The skilled artisan will recognize the method is distinguishable from data mirroring, which predetermines where the data is stored and stores a complete copy of the source data. Contrarily, the present embodiments can replicate the data in a second ISE 108 to satisfy a first access command and then subsequently replicate the same data in a different third ISE 108 to satisfy a second access command.

Figure 14:
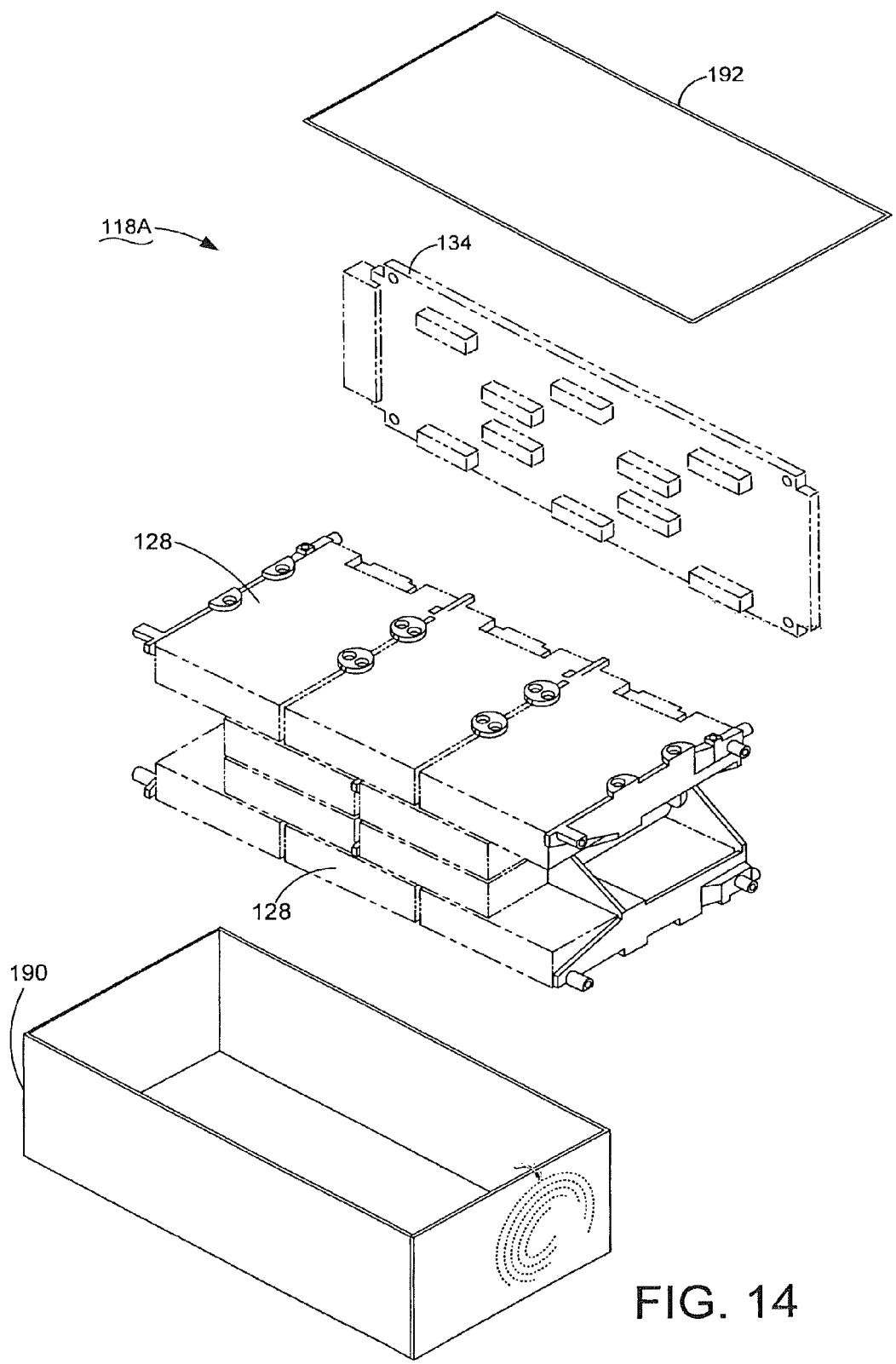
FIG. 14 is a view similar to FIG. 3 but with the data storage devices and circuit board contained within a sealed enclosure.

Finally, FIG. 14 is a view similar to FIG. 4 but with the plurality of data storage devices 128 and circuit board 134 contained within a sealed enclosure made from a base 190 with a cover 192 sealingly attached thereto. Sealingly engaging the data storage devices 128 forming the MDA 118A provides numerous advantages to the user including guaranteeing the arrangement of the data storage devices 128 is not altered from a preselected optimal arrangement. Such an arrangement also permits the MDA 118A manufacturer to tune the system for optimal performance, given that the number, size, and type of data storage devices 128 can be clearly defined.

The sealed MDA 118A also allows the manufacturer to maximize the reliability and fault tolerance of the group of storage medium within, while all but eliminating service events for the life of the MDA 118A. This is done by optimizing the drives in the multi-spindle arrangement. Design optimizations can reduce cost, increase performance, increase reliability, and generally extend the life of data within the MDA 118A. Furthermore, the design of the MDA 118A itself provides an almost zero rotational vibration and high cooling efficiency environment, which is the subject matter of pending U.S. application Ser. No. 11/145,404 entitled Storage Array with Enhanced RVI and assigned to the assignee of the present application. This allows the storage medium within to be manufactured to less costly standards without compromising the MDA 118 reliability, performance, or capacity. The sealed MDA 118A thus provides no single point of failure and near perfect rotational vibration avoidance and cooling efficiency. This allows designing the MDA 118A for optimal disc medium characteristics, and reduces cost while at the same time increasing reliability and performance.

In summary, a self-contained ISE for a distributed storage system is provided, including a plurality of rotatable spindles each supporting a storage medium adjacent a respective independently moveable actuator in a data storing and retrieving relationship with the storage medium. The ISE further includes an ISP adapted for mapping a virtual storage volume to the plurality of mediums for use by a remote device of the distributed storage system.

In some embodiments the ISE has the plurality of spindles and mediums contained within a common sealed housing. Preferably, the ISP allocates memory in the virtual storage volume for storing data in a fault tolerant manner, such as in a RAID methodology. The ISP is furthermore capable of performing managed reliability methodologies in the data storage process, such as initiating in-situ deterministic preventive recovery steps in response to an observed predicted storage failure. Preferably, the ISE is made of a plurality of data storage devices each having a disc stack made of two of more discs of data storage medium.

In other embodiments an ISE is contemplated for a distributed storage system comprising a self-contained plurality of discrete data storage devices and an ISP communicating with the data storage devices and adapted for abstracting a command received from a remote device and associating related memory accordingly. Preferably, the ISP is adapted for mapping a virtual storage volume to the plurality of data storage devices for use by one or more remote devices of the distributed storage system. As before, the plurality of data storage devices and mediums can be contained within a common sealed housing. Preferably, the ISP allocates memory in the virtual storage volume for storing data in a fault tolerant manner, such as in a RAID methodology. The ISP can furthermore initiate in-situ deterministic preventive recovery steps in the data storage devices in response to an observed predicted storage failure.

In alternative embodiments a distributed storage system is provided comprising a host; and a backend storage subsystem in communication with the host over a network and comprising means for virtualizing a self-contained storage capacity independently of the host.

The means for virtualizing can be characterized by a plurality of discrete individually accessible data storage units. The means for virtualizing can be characterized by mapping a virtual block of storage capacity associated with the plurality of data storage units. The means for virtualizing can be characterized by sealingly containerizing the plurality of data storage units and associated controls. The means for virtualizing can be characterized by storing data in a fault tolerant manner, such as without limitation to RAID methodology. The means for virtualizing can be characterized by initiating in-situ deterministic preventive recovery steps in response to an observed predicted storage failure. The means for virtualizing can be characterized by a multiple spindle data storage array.

For purposes herein the term "means for virtualizing" expressly does not contemplate previously attempted solutions that included the system intelligence for mapping the data storage space anywhere but within the respective data storage subsystem. For example, "means for virtualizing" does not contemplate the use of a storage manager to control the functions of data storage subsystems; neither does it contemplate the placement of the manager or switch within the SAN fabric, or within the host.

The present embodiments are alternatively characterized as a data storage system comprising a virtualization engine connected to a remote device over a network for passing access commands between the remote device and a storage space. The data storage system furthermore has a plurality of intelligent storage elements (ISEs) that are uniquely addressable by the virtualization engine for passing the access commands, wherein the ISEs are configured for replicating data from a first ISE to a second ISE independently of access commands being simultaneously passed between the virtualization engine and the first ISE.

In some embodiments each ISE has a plurality of rotatable spindles, each supporting a storage medium adjacent a respectively independently moveable actuator in a data storing and retrieving relationship therewith. The plurality of spindles and mediums can be contained in a common sealed housing.

Each ISE has a processor for mapping and managing virtual storage volumes to the plurality of mediums. Each ISE processor preferably allocates memory in the virtual storage volume for storing data in a fault tolerant manner, such as in a selected one of a plurality of different redundant array of independent drive (RAID) methodologies.

Each ISE processor can perform self-initiating in-situ deterministic preventive recovery steps in response to an observed storage failure. In so doing, each ISE processor can be configured for allocating a second virtual storage volume in response to the observed storage failure. In some embodiments each ISE processor is configured for allocating the second virtual storage volume in a different ISE.

The present embodiments are furthermore alternatively characterized as a method for processing access commands between a virtualization engine and an intelligent storage element while simultaneously replicating data from the intelligent storage element to another storage space.

The processing step can be characterized by the intelligent storage element mapping and managing a virtual storage volume to self-contained physical storage. Preferably, the replicating step is characterized by the intelligent storage element self-initiating in-situ deterministic preventive recovery steps in response to observing a storage failure.

The replicating step can be characterized by the intelligent storage element allocating a second virtual storage volume in response to the observed storage failure. In some embodiments the replicating step is characterized by allocating the second virtual storage volume in relation to physical storage that is addressed differently by the virtualization engine for the processing step. For example, the replicating step can be characterized by allocating the second virtual storage volume internally to the intelligent storage element; alternatively, the replicating step can be characterized by allocating the second virtual storage volume externally to the intelligent storage element. That is, the replicating step can be characterized by allocating the second virtual storage volume in a second intelligent storage element.

The processing step can be characterized by allocating memory and storing data in a fault tolerant manner. The processing step can also be characterized by moving a data transfer element and a storage medium in relation to each other in a data transfer relationship within a common sealed housing.

The present embodiments are alternatively characterized by a data storage system with a plurality of intelligent storage elements individually addressable by a virtualization engine, and means for replicating data between the intelligent storage elements. For purposes of this description and the appended claims, the phrase "means for replicating," in accordance with the described structure and equivalents thereof, contemplates data replication from a logical unit to another logical unit that occurs without otherwise interrupting normal I/O command processing associated with host access commands.

The present embodiments are alternatively characterized by a data storage system with a virtualization engine connectable to a remote device over a network for passing access commands between the remote device and a storage space. A plurality of ISEs are configured for replicating data from a first ISE to a second ISE independently of access commands being simultaneously passed between the virtualization engine and the first ISE. Each ISE can have a plurality of rotatable spindles each supporting a storage medium adjacent a respectively independently moveable actuator in a data storing and retrieving relationship therewith.

The replicated data generally provides a read-only copy of a block size only sufficient to satisfy the pending access command. That is, the ISE can replicate all or only a portion of a LUN, or all or only a portion of a LUN and its sub-LUN, or all or only a portion of a sub-LUN.

The first ISE (unit master) is configured to identify the second ISE from the plurality of ISEs as having a comparatively high processing capability for satisfying an access command associated with the replicated data. The processing capability determination can be made in relation to a resource availability, pending I/O command queue depth, or managed reliability.

The present embodiments are alternatively characterized by a method for processing access commands between a virtualization engine and an ISE while simultaneously replicating data from the ISE to another storage space. Generally, the method contemplates replicating only that data necessary to satisfy a pending access command. In some embodiments the replicating step is characterized by replicating only a portion of a LUN in a first ISE to a read-only copy in a second ISE; alternatively, the replicating step is characterized by replicating an entire LUN in a first ISE to a read-only copy in a second ISE; alternatively, the replicating step is characterized by replicating a LUN and its respective sub-LUN in a first ISE to a read-only copy in a second ISE; alternatively, the replicating step is characterized by replicating only a sub-LUN in a first ISE to a read-only copy in a second ISE.

The processing step is characterized by the first ISE of a plurality of ISEs being configured to identify a second ISE from the plurality of ISEs as having a comparatively high processing capability for satisfying an access command associated with the replicated data. The processing capability determination can be made in relation to resource availability, pending I/O command queue depth, and managed reliability. The processing capability determination can result in the replication being directed internally, externally, or globally with respect to the first ISE.

The method can be further characterized by selecting a rate at which the data is replicated in relation to a desired performance of the target storage space. Generally, the replication directs the read-only copies to any of the plurality of target storage spaces. For example, the method can replicate data from a first ISE to a second ISE to satisfy a first pending access command, and subsequently replicate the data to a second ISE to satisfy a subsequent access command for the same data.

The present embodiments are alternatively characterized by a data storage system with the plurality of ISEs individually addressable by a virtualization engine and means for replicating data between the intelligent storage elements. For purposes of this description and meaning of the appended claims, the term "means for replicating" requires the structure disclosed herein permitting the unit master controller to assess system-wide performance parameters and direct the replication of data for satisfying a pending access command accordingly.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A data storage system comprising:
   a virtualization engine connectable to a remote device via a network for passing an access command (I/O) between the remote device and data stored with respect to virtualized logical unit numbers (LUNs) in a storage space; and
   a plurality of intelligent storage elements (ISEs) defining the storage space and configured for selectively replicating a LUN from a first ISE having a first controller to a second ISE having a second controller, the selective replicating based entirely on the first controller, and thereby not the remote device or any network device, determining to switch from a normal I/O processing mode to a global replication I/O processing mode that satisfies the access command via the replicated LUN in the second ISE during a time when the first controller is not failing.

2. The system of claim 1 wherein each ISE comprises a plurality of rotatable spindles each supporting a storage medium adjacent a respectively independently moveable actuator in a data storing and retrieving relationship therewith.

3. The system of claim 1 wherein the first controller is capable of replicating only a portion of the LUN in the first ISE to a read-only copy in the second ISE.

4. The system of claim 1 wherein the first controller is capable of replicating an entirety of the LUN in the first ISE to a read-only copy in the second ISE.

5. The system of claim 1 wherein the first controller is capable of replicating the LUN and a corresponding sub-LUN in the first ISE to a read-only copy in the second ISE.

6. The system of claim 5 wherein the first controller is capable of replicating only the sub-LUN in the first ISE to a read-only copy in the second ISE.

7. The system of claim 1 wherein the first ISE is configured to identify the second ISE from the plurality of ISEs as having a comparatively higher processing capability for satisfying the access command.

8. The system of claim 1 wherein the switch is determined in relation to a parameter of a set of parameters consisting of resource availability, pending I/O command queue depth, and managed reliability.

9. A method comprising:
   processing access commands (I/Os) from a remote device via a network to a plurality of intelligent storage elements (ISEs);
   during the processing step, switching from a normal I/O processing mode to a global replication I/O processing mode for a pending access command directed to a virtualized storage logical unit number (LUN) because a second ISE having a second controller not controlling physical storage allocated to the LUN is preferable to a first ISE having a first controller controlling physical storage allocated to the LUN during a time when the first controller is not failing; and
   in response to the switching step, replicating at least a portion of the LUN from the first ISE to the second ISE in an absence of any command from the remote device via the network that is determinative in performing the replicating data step.

10. The method of claim 9 wherein the replicating step is characterized by replicating only a portion of the LUN in the first ISE to a read-only copy in the second ISE.

11. The method of claim 9 wherein the replicating step is characterized by replicating an entirety of the LUN in the first ISE to a read-only copy in the second ISE.

12. The method of claim 9 wherein the replicating step is characterized by replicating the LUN and a respective sub-LUN in the first ISE to a read-only copy in the second ISE.

13. The method of claim 9 wherein the replicating step is characterized by replicating only the sub-LUN in the first ISE to a read-only copy in the second ISE.

14. The method of claim 9 wherein the replicating step is characterized by the first ISE being configured to identify the second ISE from the plurality of ISEs as having a comparatively higher processing capability for satisfying the pending access command.

15. The method of claim 9 wherein the processing capability is determined in relation to a parameter from a set of parameters consisting of resource availability, pending I/O command queue depth, and managed reliability.

16. The method of claim 9 wherein the processing step is characterized by the first ISE replicating data internally to the first ISE.

17. The method of claim 9 wherein the processing step is characterized by the first ISE replicating data externally to the first ISE.

18. The method of claim 9 wherein the processing step is characterized by the second ISE replicating data in the second ISE in response to another pending access command directed to a different LUN.

19. The method of claim 9 wherein the processing step is characterized by selecting a rate at which the data is replicated in relation to a desired performance of one or more of the ISEs.

* * * * *